US011956592B2

(12) United States Patent
Wan et al.

(10) Patent No.: US 11,956,592 B2
(45) Date of Patent: Apr. 9, 2024

(54) UNDERWATER SPEAKER

(71) Applicant: SHENZHEN HAIKE INNOVATION ELECTRONICS CO., LTD., Shenzhen (CN)

(72) Inventors: Gangbin Wan, Shenzhen (CN); Jianliang Xiong, Shenzhen (CN); Bin Xiong, Shenzhen (CN)

(73) Assignee: SHENZHEN HAIKE INNOVATION ELECTRONICS CO., LTD., Shenzhen (CN)

(*) Notice: Subject to any disclaimer, the term of this patent is extended or adjusted under 35 U.S.C. 154(b) by 0 days.

(21) Appl. No.: 18/456,492

(22) Filed: Aug. 27, 2023

(65) Prior Publication Data

US 2023/0403503 A1 Dec. 14, 2023

(30) Foreign Application Priority Data

Aug. 7, 2023 (CN) ......................... 202322111261.8

(51) Int. Cl.

| | |
|---|---|
| ***H04R 1/44*** | (2006.01) |
| ***F21V 1/02*** | (2006.01) |
| ***F21V 33/00*** | (2006.01) |
| ***H04R 1/02*** | (2006.01) |

(52) U.S. Cl.
CPC ................. *H04R 1/44* (2013.01); *F21V 1/02* (2013.01); *F21V 33/0056* (2013.01); *H04R 1/02* (2013.01); *H04R 2207/021* (2013.01)

(58) Field of Classification Search
CPC ...... H04R 1/44; H04R 1/02; H04R 2207/021; F21V 1/02; F21V 33/0056
See application file for complete search history.

(56) References Cited

U.S. PATENT DOCUMENTS

| | | | | |
|---|---|---|---|---|
| 9,784,417 | B1 * | 10/2017 | Springer | F21V 23/006 |
| 11,582,958 | B2 * | 2/2023 | Schuchter | F21V 31/005 |
| 2017/0078775 | A1 * | 3/2017 | McGarry | H04R 1/06 |
| 2018/0084339 | A1 * | 3/2018 | Asuncion | H04N 23/51 |
| 2019/0335270 | A1 * | 10/2019 | Yanagidate | H04R 7/12 |
| 2019/0335278 | A1 * | 10/2019 | Gong | H04R 7/18 |
| 2019/0394560 | A1 * | 12/2019 | Lai | H04R 1/2849 |
| 2020/0124262 | A1 * | 4/2020 | Paris | F21V 23/0485 |
| 2021/0244007 | A1 * | 8/2021 | Schuchter | H05B 47/105 |

FOREIGN PATENT DOCUMENTS

| | | | | |
|---|---|---|---|---|
| CN | 205681605 U | * 11/2016 | | H04R 1/20 |

* cited by examiner

*Primary Examiner* — Oyesola C Ojo
(74) *Attorney, Agent, or Firm* — Zhigang Ma

(57) ABSTRACT

The present disclosure provides an underwater speaker. The underwater speaker includes an outer shell, with a circuit board arranged inside, a speaker, and a lampshade with a first opening at the top. The speaker is electrically connected to the circuit board. The luminescent body is arranged on the circuit board. The luminescent body is oriented towards the interior of the lampshade, and a graphic mapping unit is formed on the lampshade. This embodiment uses the speaker to play audio and achieve the function of an underwater speaker. When the luminescent body emits light, the light can be mapped onto the water. This improves the multiplicity and effect of light and shadow, and meets users' needs for complex and multi-element light and shadow effects.

19 Claims, 8 Drawing Sheets

UNDERWATER SPEAKER

CROSS-REFERENCE TO RELATED APPLICATIONS

The application claims priority of Chinese patent application CN2023221112618, filed on 2023 Aug. 7, which is incorporated herein by reference in its entireties.

TECHNICAL FIELD

The present disclosure relates to the field of speakers, in particular, relates to an underwater speaker.

BACKGROUND

At present, the Bluetooth speakers used in swimming pools generally float on the water surface and play music by connecting to mobile phones through Bluetooth. However, the present Bluetooth speakers used in swimming pools with lighting effects typically use a water textured lampshade as the outer shell to create a light and shadow effect after the light is emitted. Different thicknesses of water texture on the outer shell are used to achieve the light and shadow effect. In this way, only the light and shadow of the water textured effect can be achieved, which cannot meet the needs of users for complex or multi-element light and shadow effects. In addition, when water enters the speaker of the Bluetooth speaker used in the swimming pool, it adheres to the film on the surface of the speaker, which can easily affect the sound quality.

SUMMARY

The main purpose of the present disclosure is to provide an underwater speaker for solving the problem of a single light and shadow effect achieved by using a water textured lampshade for existing Bluetooth speakers used in swimming pools.

In order to solve the above technical problem, in the technical solutions provided by the embodiments of the present disclosure, an underwater speaker, wherein it includes an outer shell, with a circuit board being arranged inside, a speaker, and a lampshade with a first opening at the top; wherein the speaker is electrically connected to the circuit board, and a luminescent body is arranged on the circuit board, and the luminescent body is oriented towards the interior of the lampshade; wherein a graphic mapping unit is formed on the lampshade.

In one embodiment, an intermediate panel is arranged inside the outer shell, and divides the outer shell into an upper chamber and a lower chamber; wherein the circuit board and the speaker are both installed inside the upper chamber; wherein the lampshade is arranged at the bottom of the intermediate panel, and the position of the intermediate panel corresponding to the luminescent body is provided with a first avoidance hole.

In one embodiment, the lampshade extends outward on the circumference of a first opening to form a first extension part, connecting to the intermediate panel.

In one embodiment, the bottom surface of the intermediate panel protrudes downwards to form a limiting wall, with the lampshade inside; wherein on the inner side of the limiting wall, there are multiple spaced adapter blocks; wherein the adapter blocks form an insertion slot with the bottom surface of the intermediate panel, and the first extension part is located inside the insertion slot.

In one embodiment, a second avoidance hole is provided at the position of the first extension part corresponding to the adapter block.

In one embodiment, the graphic mapping unit can be a through hole, a graphics groove formed by a concave inner or outer wall of the lampshade, or a graphics convex block formed by a convex inner or outer wall of the lampshade.

In one embodiment, the shape of the graphic mapping unit is one or more shapes of animals, plants, geometrics, or irregular shapes.

In one embodiment, the outer shell is provided with a sound outlet in the corresponding sound direction of the speaker, and a flexible protective cover is arranged on the diaphragm of the speaker, with the protective cover protruding towards the direction of the sound outlet.

In one embodiment, the circuit board is provided with multiple key switches, and the corresponding position of the key switch in the outer shell is provided with a pressing element.

In one embodiment, a second opening is provided at the position of the key switch corresponding to the outer shell, and the outer shell extends downwards on the circumference of the second opening to form a compression wall; wherein the pressing element is provided with a holding slot with a third opening at the bottom, and the pressing element is placed inside the compression wall and sleeved on multiple key switches; wherein the material of the pressing element is soft adhesive, and the bottom circumference of the pressing element extends outward to form a sealing extension, locating between the compression wall and the circuit board.

In one embodiment, the top of each key switch in the holding slot is provided with a pressing convex column.

In one embodiment, a supporting frame with fourth openings at the upper and lower ends is provided in the holding slot to support the pressing element.

In one embodiment, the supporting frame is sleeved on the outer side of multiple key switches, and a supporting partition is set between two adjacent key switches within the supporting frame.

In one embodiment, the height of the supporting frame is consistent with the depth of the holding slot; wherein the bottom circumference of the supporting frame extends outward to form a second extension portion, locating between the sealing extension portion and the circuit board; wherein the depth of the holding slot is consistent with the height of the supporting frame after removing the second extension portion.

In one embodiment, a battery is electrically connected to the circuit board in the upper chamber, and the battery is located on one side of the speaker 3.

In one embodiment, the battery is a rechargeable battery, and the outer shell is provided with a charging interface, electrically connecting to the circuit board and used for external power supply; wherein the position of the charging interface corresponding to the outer shell is equipped with an openable waterproof rubber plug.

In one embodiment, the sound outlet is located at the top of the middle of the outer shell, and the pressing element is located on the side of the speaker away from the battery; wherein there is also a counterweight in the upper chamber, and the counterweight and the charging interface are both located on the side of the speaker away from the battery.

In one embodiment, the outer shell includes a surface shell and a bottom shell connected to the surface shell; wherein the intermediate panel is installed on the surface shell; wherein the upper chamber is formed surrounding by the surface shell and the intermediate panel, and the lower chamber is formed surrounding by the intermediate panel and the bottom shell; wherein the compression wall, the sound outlet, and the second opening are all located on the surface shell; wherein the materials of the bottom shell and the lampshade are both transparent materials; wherein a sealing ring is set between the surface shell and the bottom shell.

In one embodiment, the bottom shell is a water textured outer shell.

In one embodiment, the outer shell also includes an outer cover sleeved on the outer side of the surface shell, and the outer cover is provided with a fifth opening on both sides of the sound outlet, and the fifth opening is conductive to the sound outlet; wherein the outer cover is provided with an echo wall protruding towards the sound outlet at the top of the sound outlet, and a waterproof rubber plug is arranged on the outer cover.

Beneficial effects: compared with the prior art, the embodiment uses the speaker to play audio and achieve the function of an underwater speaker. The lampshade is installed inside the outer shell, in conjunction with the graphic mapping unit on the lampshade. When the luminescent body emits light, the light can be mapped onto the water, ground, or wall through the lampshade and the outer shell, forming a light and shadow in the shape of the graphic mapping unit. This improves the multiplicity and effect of light and shadow, and meets users' needs for complex and multi-element light and shadow effects, solving the problem of a single light and shadow effect achieved by using a water textured outer shell for the existing Bluetooth speakers used in swimming pools.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those ordinarily skilled in the art without doing creative work shall fall within the protection scope of the present disclosure.

Referring to FIGS. 1-8, an underwater speaker of this embodiment.

Figure 2:
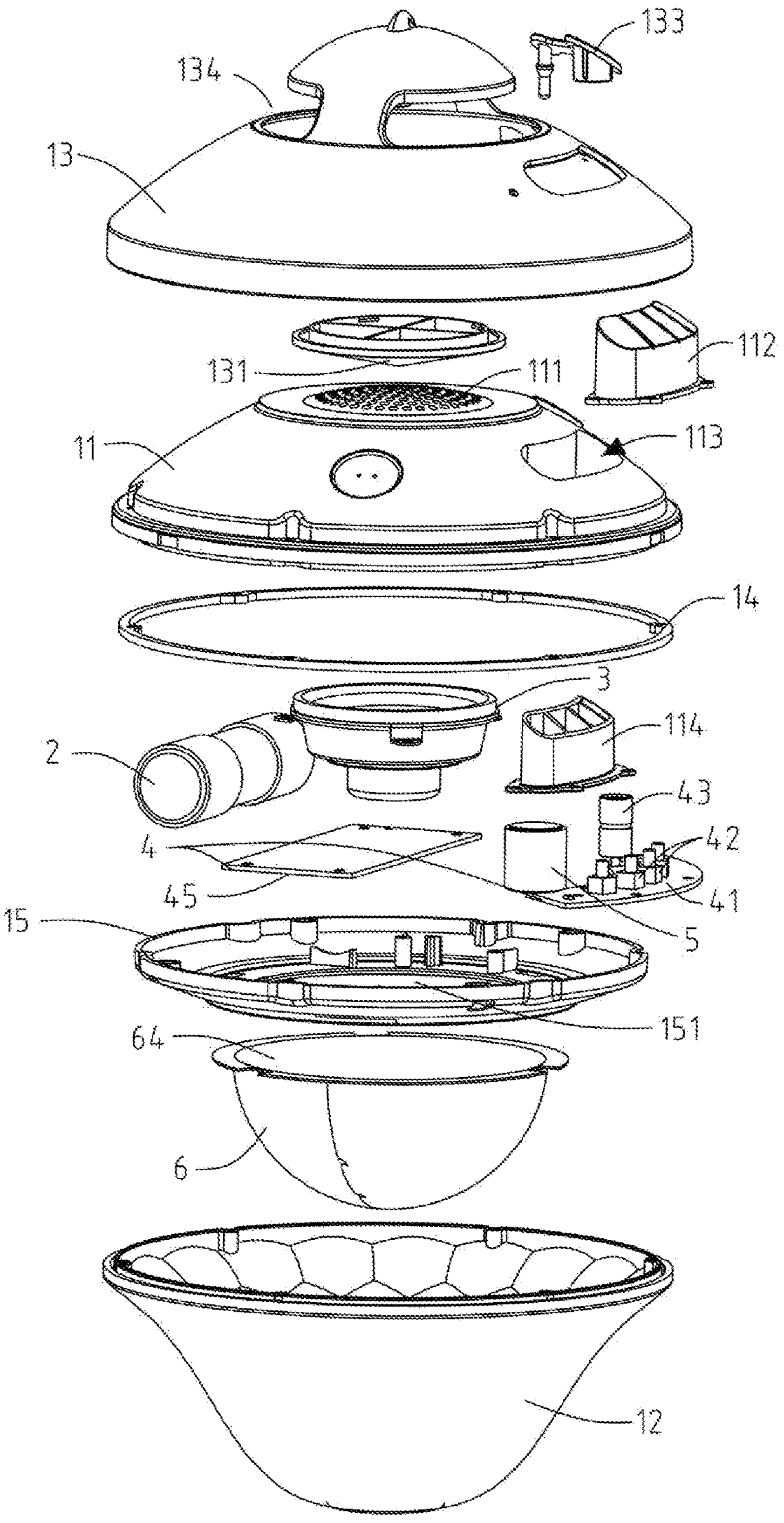
FIG. 2 is an exploded diagram of the present disclosure.

Referring to FIG. 2, the underwater speaker includes an outer shell 1, with a circuit board 4 arranged inside, a speaker 3, and a lampshade 6 with a first opening 64 at the top. The speaker 3 is electrically connected to the circuit board 4, and a luminescent body 44 is arranged on the circuit board 4. The luminescent body 44 is oriented towards the interior of the lampshade 6, and a graphic mapping unit 61 is formed on the lampshade 6.

This embodiment uses the speaker 3 to play audio and achieve the function of an underwater speaker. The lampshade 6 is installed inside the outer shell 1, in conjunction with the graphic mapping unit 61 on the lampshade 6. When the luminescent body 44 emits light, the light can be mapped onto the water, ground, or wall through the lampshade 6 and the outer shell 1, forming a light and shadow in the shape of the graphic mapping unit 61. This improves the multiplicity and effect of light and shadow, and meets users' needs for complex and multi-element light and shadow effects, solving the problem of a single light and shadow effect achieved by using a water textured outer shell 1 for the existing Bluetooth speakers used in swimming pools.

Specifically, in the above embodiments, the graphic mapping unit 61 can be a through hole, a graphics groove formed by a concave inner or outer wall of the lampshade 6, or a graphics convex block formed by a convex inner or outer wall of the lampshade 6. The graphics groove can be a groove formed by a concave edge of the graphics or a groove formed by an overall concave.

The shape of the graphic mapping unit 61 can be one or various kinds of animals, plants, geometries, or irregular shapes, for example, animals can be shapes of fish, flamingos, cranes, starfish, etc., plants can be shapes of seaweed, grass, trees, leaves, etc., and geometries can be shapes of diamonds, hexagons, triangles, pentagons, etc. When the shape of the graphic mapping unit 61 is a fish, the light of the luminescent body 44 can be used to map the shape of the fish. When the underwater speaker in this embodiment is placed in the water, a scene of fish in the water can be achieved; when the underwater speaker moves with the fluctuations of the water, a scene of fish movement can be achieved. This improves the playability and entertainment of the underwater speaker.

Figure 4:
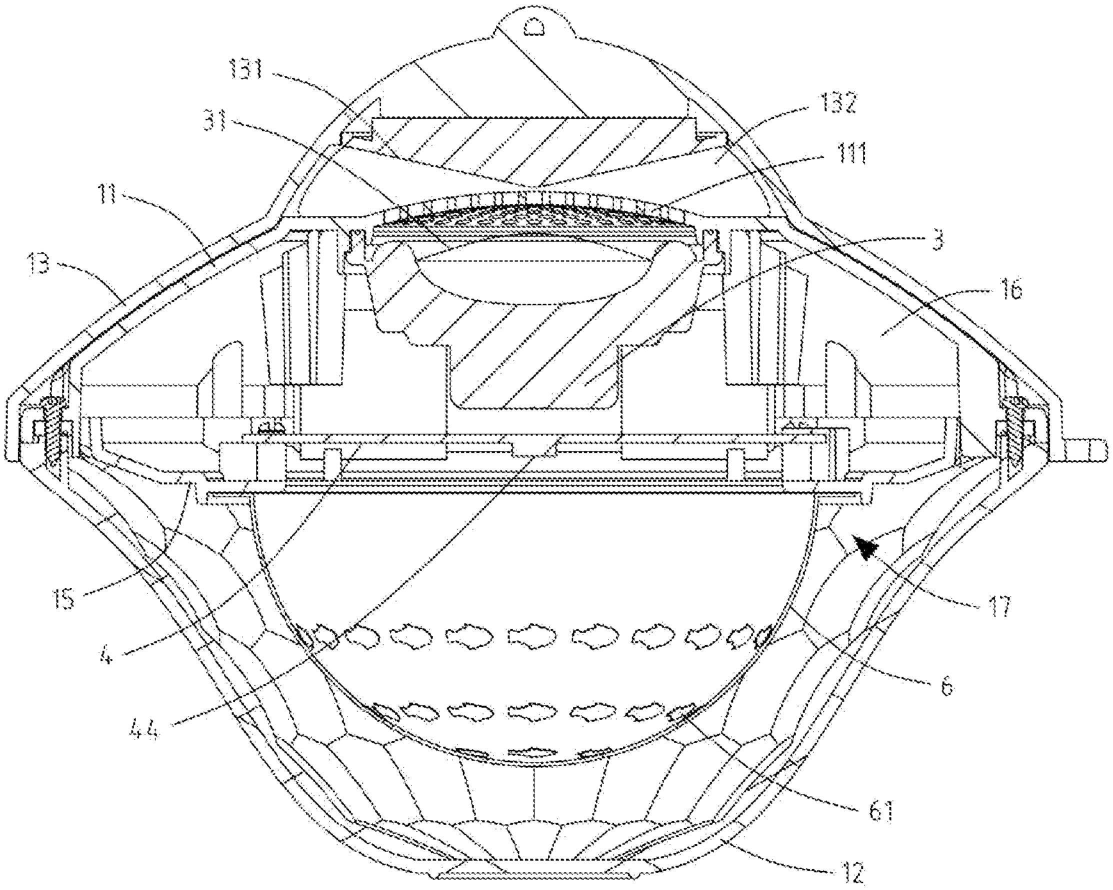
FIG. 4 is a cross-sectional view of the present disclosure cut along the middle line.
Figure 5:
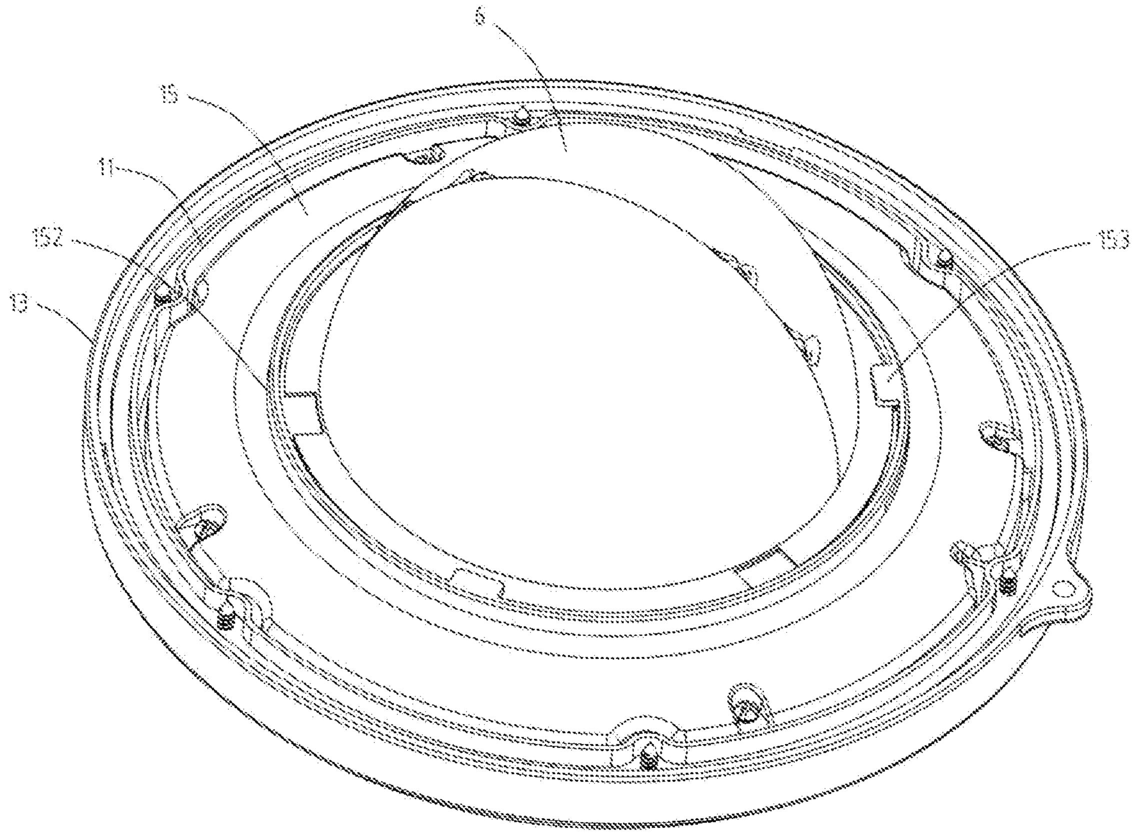
FIG. 5 is a schematic diagram of the present disclosure after removing the bottom shell.

Referring to FIGS. 2 and 4, an intermediate panel 15 is arranged inside the outer shell 1, and divides the outer shell 1 into an upper chamber 16 and a lower chamber 17. The circuit board 4 and the speaker 3 are both installed inside the upper chamber 16, and the lampshade 6 is arranged at the bottom of the intermediate panel 15. The position of the intermediate panel 15 corresponding to the luminescent body 44 is provided with a first avoidance hole 151.

When the water speaker is floating in the water of the swimming pool, the lower part is in the water and the upper part is on the water. The intermediate panel 15 is used to divide the interior of the outer shell 1, and the lampshade 6 is located at the bottom of the intermediate panel 15, that is, it is located in the lower chamber 17, so as to prevent the circuit board 4, the speaker 3 and other components from blocking the penetration of the light of the luminescent body 44 and affecting the formed light and shadow effect.

Figure 3:
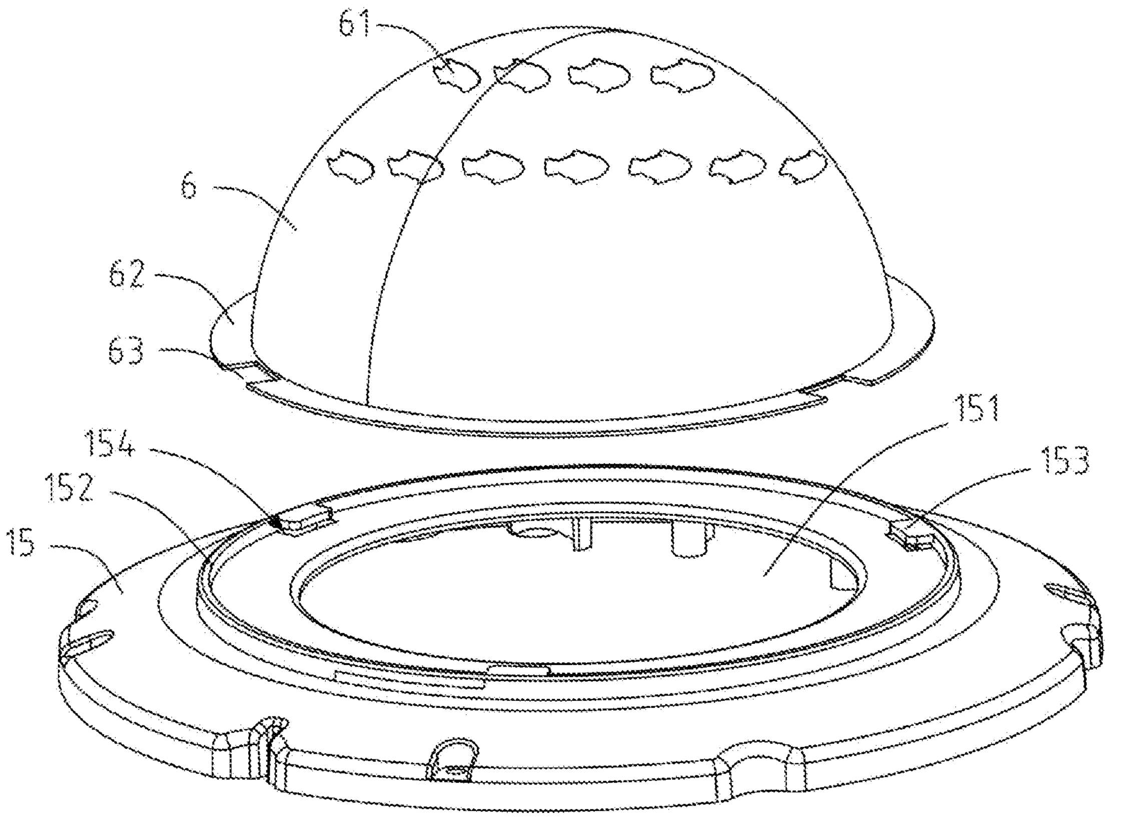
FIG. 3 is an exploded view of the lampshade and intermediate panel of the present disclosure.

Referring to FIG. 3, the lampshade 6 extends outward on the circumference of the first opening 64 to form a first extension part 62, connecting to the intermediate panel 15 to enable the installation of the lampshade 6 on the intermediate panel 15.

Specifically, the bottom surface of the intermediate panel 15 protrudes downwards to form a limiting wall 152, with the lampshade 6 being installed inside. On the inner side of the limiting wall 152, there are multiple spaced adapter blocks 153. The adapter blocks 153 form an insertion slot 154 with the bottom surface of the intermediate panel 15, and the first extension part 62 is located inside the insertion slot 154. By utilizing the limitations of the adapter blocks 153, the lampshade 6 can be installed at the bottom of the intermediate panel 15. In this way, the lampshade 6 can be easily installed without utilizing tools.

Specifically, the size of the first avoidance hole 151 is slightly smaller than the diameter of the first opening 64, or slightly larger than the diameter of the first opening 64 but smaller than the diameter of the first extension part 62, in order to prevent a middle surface shell 11 from blocking the penetration of light emitted by the luminescent body 44.

In this embodiment, a second avoidance hole 63 is provided at the position of the first extension part 62 corresponding to the adapter block 153. Therefore, when the lampshade 6 is installed on the intermediate panel 15, the second avoidance hole 63 can be aligned with the adapter block 153, and then the lampshade 6 can be rotated to place the first extension part 62 in the insertion slot 154 to achieve the installation of the lampshade 6 on the intermediate panel 15. Of course, in the absence of the second avoidance hole 63, the lampshade 6 can adopt a thin shell to deform under hand pressure, in order to place the first extension part 62 on the lampshade 6 in the insertion slot 154. Of course, in other embodiments, the first extension part 62 can be directly fixed to the intermediate panel 15 through screws; alternatively, the bottom of the intermediate panel 15 protrudes downwards to form a column, with the bottom of the column forming an inverted trapezoidal or inverted conical shape. The first extension part 62 is provided with a clamping hole, with the column being placed inside. By using the inverted trapezoidal or inverted conical limit clamp, the lampshade 6 can also be installed at the bottom of the intermediate panel 15.

Furthermore, in other embodiments, the top of lampshade 6 can be directly connected to the intermediate panel 15 through buckles or gluing, etc. The connection method between the lampshade 6 and the intermediate panel 15 is not limited here.

Referring to FIG. 4, the outer shell 1 is provided with a sound outlet 111 in the corresponding sound direction position of the speaker 3; and a flexible protective cover 31 is arranged on the diaphragm of the speaker 3, with the protective cover 31 protruding towards the direction of the sound outlet. Specifically, the flexible protective cover 31 covers the diaphragm inside, so that when water droplets or dust enter the speaker 3 through the sound outlet 111, they will not adhere to the diaphragm, but will fall onto the convex protective cover 31 and work on the speaker 3. The vibration of the diaphragm can drive the protective cover 31 to vibrate together, to shake the water droplets or dust out of the direction of the sound outlet 111, preventing liquid or dust from affecting the sound effect, and improving the efficiency of the speaker in this embodiment.

Specifically, the flexible protective cover 31 is an aluminum cap. The aluminum cap that protrudes towards the sound outlet 111 can make the sound smoother and thicker as the sound device vibrates towards the sound outlet 111, thus improving the sound effect.

Figure 1:
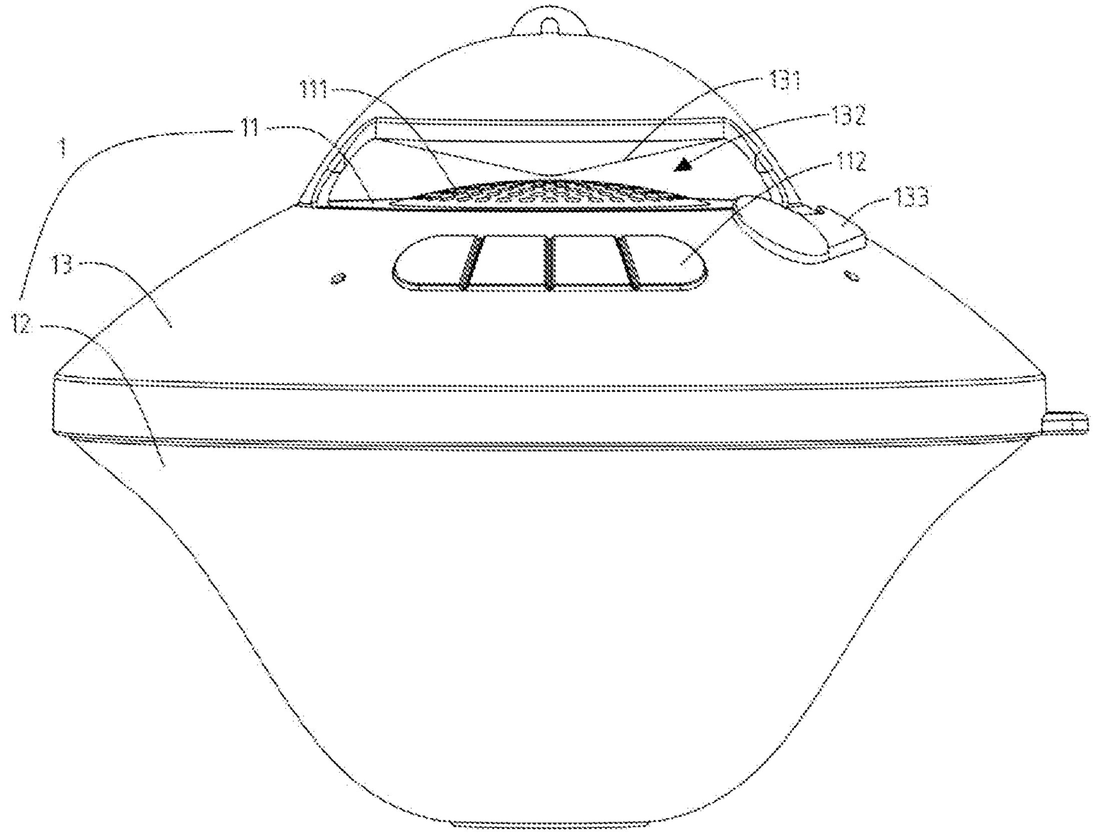
FIG. 1 is a stereogram of the present disclosure.

Referring to FIGS. 1 and 2, the circuit board 4 is provided with multiple key switches 42, and the corresponding position of the key switch 42 in the outer shell 1 is provided with a pressing element 112. Thus, by pressing the pressing element 112, the key switch 42 can be pressed to control the underwater speaker in this embodiment. Among them, multiple key switches 42 can be used to adjust the volume of speaker 3, start and stop the underwater speaker, select sound effects, and start and stop the luminescent body 44. Manufacturers can limit the number of switch buttons and functions as needed.

Figure 6:
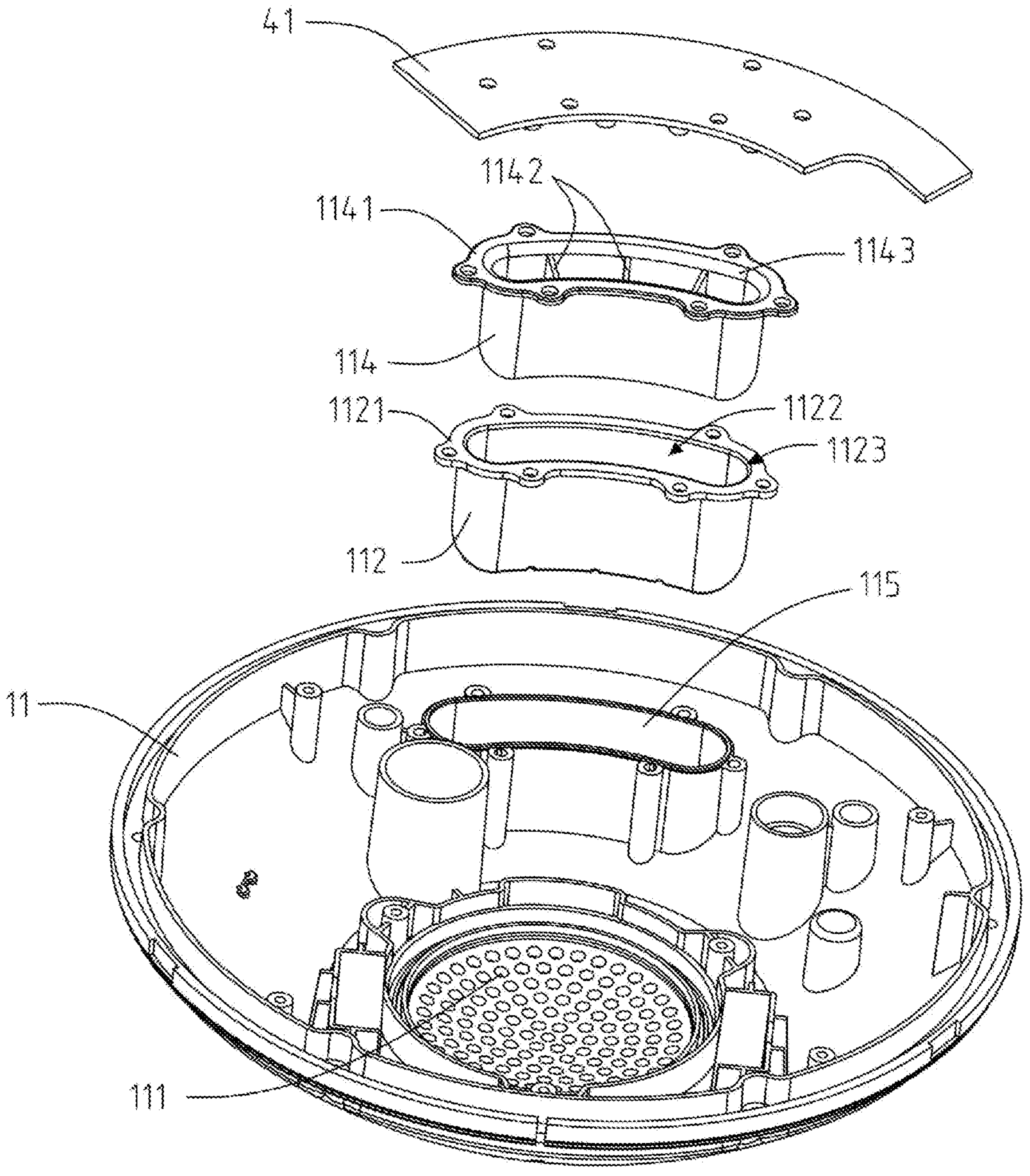
FIG. 6 is an exploded view of the surface shell, the pressing element, the supporting frame, and the adapter block of the present disclosure.
Figure 7:
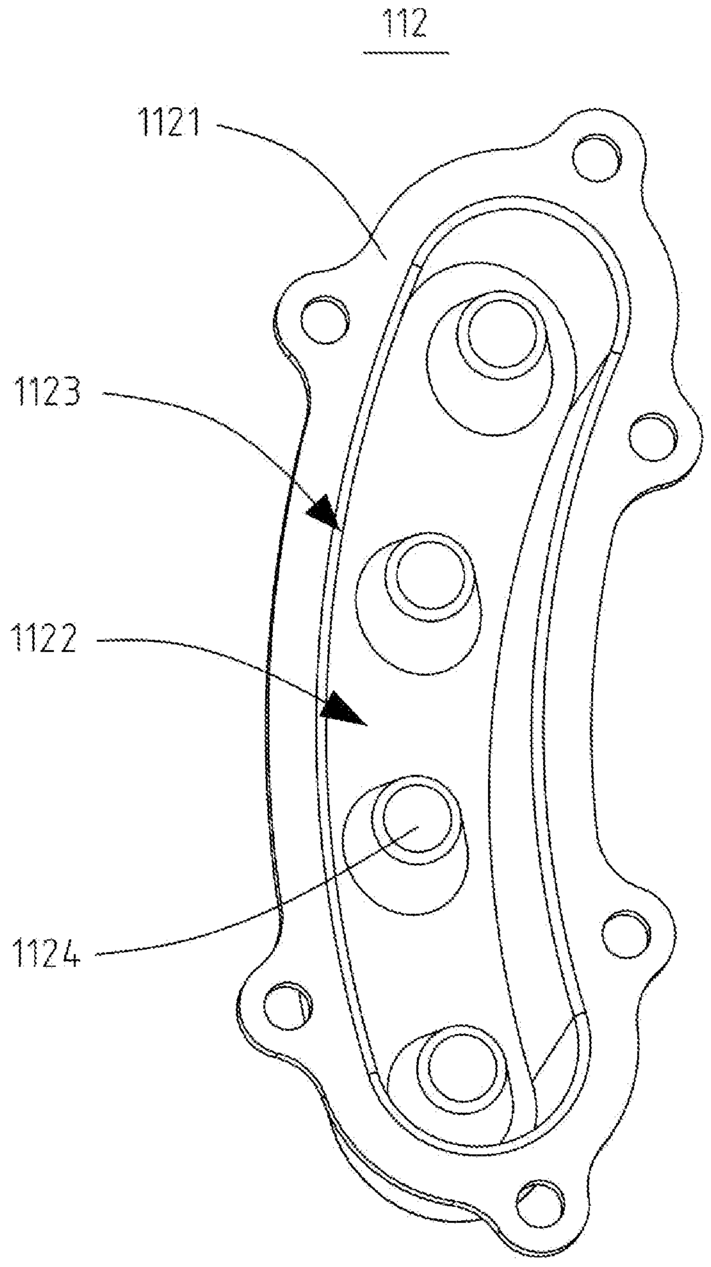
FIG. 7 is a structural diagram of the pressing element of the present disclosure.

Referring to FIGS. 2, 6, and 7, a second opening 113 is provided at the position of the key switch 42 corresponding to the outer shell 1. The outer shell 1 extends downwards on the circumference of the second opening 113 to form a compression wall 115. The pressing element 112 is provided with a holding slot 1122 with a third opening 1123 at the bottom. The pressing element 112 is placed inside the compression wall 115 and sleeved on multiple key switches 42. The material of the pressing element 112 is soft adhesive, and the bottom circumference of the pressing element 112 extends outward to form a sealing extension 1121. The sealing extension 1121 is located between the compression wall 115 and the circuit board 4. In this way, water can be prevented from entering the upper chamber 16 from the gap between the compression wall 115 and the side wall of the pressing element 112.

Specifically, the circuit board 4 includes a lamp board 45 and an adapter board 41. Among them, the luminescent body 44 is located on the lamp board 45, and the two ends of the lamp board 45 are respectively locked on the intermediate panel 15 and located on both sides of the second avoidance hole 63 through screws. The key switch 42 is located on the adapter board 41, and the adapter board 41 is locked onto the outer shell 1 by screws to facilitate the configuration of the luminescent body 44 and the key switch 42.

The top of each key switch 42 in the holding slot 1122 is provided with a pressing convex column 1124. Therefore, by pressing the surface of the pressing element 112 where the convex column 1124 is located, the key switch 42 can be pressed. By pressing the convex column 1124, the height of the upper chamber 16 can be raised, facilitating the installation of the speaker 3.

The pressing element 112 is made of soft adhesive material, thus it is easy to cause the pressing element 112 to sag under pressure. Therefore, a supporting frame 114 with fourth openings 1143 at the upper and lower ends is provided in the holding slot 1122 to support the pressing element 112.

To further prevent the depression of the pressing element 112 under pressure, the supporting frame 114 is sleeved on the outer side of multiple key switches 42, and a supporting partition 1142 is set between two adjacent key switches 42 within the supporting frame 114 to increase the support effect on the pressing element 112.

In order to effectively support the pressing element 112 with the supporting frame 114 to prevent the pressing element 112 from sinking, the height of the supporting frame 114 is consistent with the depth of the holding slot 1122. In this condition, the entire supporting frame 114 is located inside the holding slot 1122. Alternatively, the bottom circumference of the supporting frame 114 extends outward to form a second extension portion 1141, locating between a sealing extension portion 1121 and the circuit board 4. The depth of the holding slot 1122 is consistent with the height of the supporting frame 114 after removing the second extension portion 1141.

The bottom surface of a convex column 1124 is in contact with the key switch 42, so that users can quickly press the key switch 42 when pressing the convex column 1124, reducing the pressure and improving the convenience.

Figure 8:
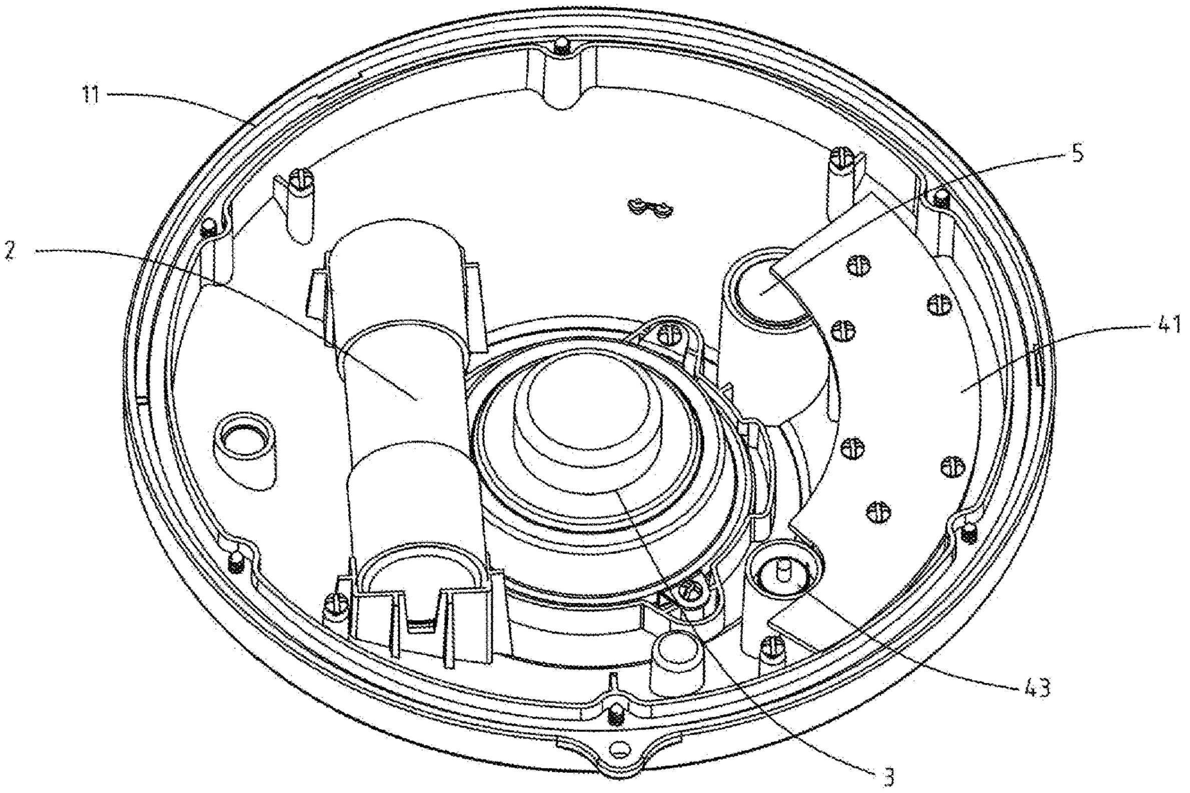
FIG. 8 is a schematic diagram of the present disclosure after removing the bottom shell, the intermediate panel, the lampshade, and the lamp panel.

Referring to FIGS. 2 and 8, there is also a battery 2 electrically connected to the circuit board 4 in the upper chamber 16. The battery 2 is located on one side of the speaker 3, and can supply power to the circuit board 4 through the battery 2, so that the circuit board 4 can control the operation of the speaker 3, the luminescent body 44, and the key switch 42 when powered on.

The battery 2 is a rechargeable battery, and the outer shell 1 is provided with a charging interface 43, electrically connecting to the circuit board 4 and used for external power supply. The position of the charging interface 43 corresponding to the outer shell 1 is equipped with an openable waterproof rubber plug 133, connecting to the external power supply through the charging interface 43. The battery 2 can be charged through the circuit board 4.

Referring to FIGS. 2 and 8, the sound outlet 111 is located at the top of the middle of the outer shell 1. It should be understood that the speaker 3 is located in the middle of the front, rear, or left and right positions of the outer shell 1. The pressing element 112 is located on the side of the speaker 3 away from the battery 2, and there is also a counterweight 5 in the upper chamber 16. The counterweight 5 and the charging interface 43 are both located on the side of the speaker 3 away from the battery 2. The weight of the left and right sides of the speaker 3 can be balanced by using the pressing element 112 and the counterweight block 5. Thus, it allows this embodiment to be placed horizontally on the water surface, preventing the product from tilting and improving the stability of the product floating on the water surface.

Specifically, referring to FIG. 2, in order to facilitate the assembly and structural compactness of the underwater speaker in this embodiment, the outer shell 1 includes a surface shell 11 and a bottom shell 12 connected to the surface shell 11. The intermediate panel 15 is installed on the surface shell 11, the upper chamber 16 is formed surrounding by the surface shell 11 and the intermediate panel 15, and the lower chamber 17 is formed surrounding by the intermediate panel 15 and the bottom shell 12. The compression wall 115, the sound outlet 111, and the second opening 113 are all located on the surface shell 11. The materials of the bottom shell 12 and the lampshade 6 are both transparent materials, and a sealing ring 14 is set between the surface shell 11 and the bottom shell 12. The sealing ring 14 enables the sealed upper chamber 16 and lower chamber 17, with a waterproof effect.

Specifically, the surface shell 11 is connected to the bottom shell 12 through screws to effectively compress the sealing ring 14. Of course, in other embodiments, the surface shell 11 can also be connected to the bottom shell 12 or the like through buckles or gluing. The speaker 3 is fixed to the surface shell 11 through screws, and a battery 2 cavity is formed between the intermediate panel 15 and the surface shell 11 for placing and limiting the battery 2.

The bottom shell 12 is a water textured outer shell 1. By utilizing the water textured outer shell 1, the light and shadow can have a water textured effect when the luminescent body 44 emits light. Coupled with the graphic mapping unit 61 on the lampshade 6, the light and shadow effect can be rich in layers and forms.

Referring to FIGS. 1 and 2, the outer shell 1 also includes an outer cover 13 sleeved on the outer side of the surface shell 11. The outer cover 13 is provided with a fifth opening 134 on both sides of the sound outlet 111, and the fifth opening 134 is conductive to the sound outlet 111. The outer cover 13 is provided with an echo wall 131 protruding towards the sound outlet 111 at the top of the sound outlet 111, and a waterproof rubber plug 133 is arranged on the outer cover 13. An echo chamber 132 is formed by the cover 13, the echo wall 131, and the sound outlet 111, and it can enhance the echo effect, the bass effect, thus improving the sound effect. Specifically, the echo wall 131 is an inverted cone, allowing the sound emitted by the speaker 3 to pass through the conical echo wall 131 and surround the conical echo wall 131 to emit echoes, with a large diffusion range and a three-dimensional sound effect.

To facilitate the stable floating of the underwater speaker, the width of the cross-section of the bottom shell 12 gradually decreases from top to bottom, and the width of the cross-section of the surface shell 11 gradually decreases from bottom to top. And the top of the surface shell 11 is separated from the echo wall 131 through the fifth opening 134, forming a spacecraft structure to improve the aesthetics of this embodiment.

The luminescent body 44 can be a lamp bead or an LED lamp, preferably a tricolor lamp. In addition, it should be noted that the control circuit used to control the luminescent body 44, the speaker 3, the key switch 42, the battery 2, etc. can be set on the lamp board 45 or the adapter board 41, without any limitations. Manufacturers can configure it according to the needs.

Specifically, the control circuit is integrated with a wireless module, and it can be used to connect mobile terminals, such as mobile phones, tablets, etc., for changing music, adjusting the volume of speaker 3, etc. Among them, wireless modules can be Bluetooth modules, 2g modules, 3g modules, 4g modules, 2.4g modules, and other RF modules.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of “first”, “second”, etc. in the present disclosure are only used for descriptive purposes, and cannot be understood as indicating or implying its relative importance or implicitly indicating the number of technical features indicated. Therefore, features defined by “first” and “second” can explicitly instruct or impliedly include at least one feature. In addition, “and/or” in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. An underwater speaker, wherein it comprises an outer shell, with a circuit board being arranged inside, a speaker, and a lampshade with a first opening at the top; wherein the speaker is electrically connected to the circuit board, and a luminescent body is arranged on the circuit board, and the luminescent body is oriented towards the interior of the lampshade; wherein a graphic mapping unit is formed on the lampshade;

wherein an intermediate panel is arranged inside the outer shell, and divides the outer shell into an upper chamber and a lower chamber; wherein the circuit board and the speaker are both installed inside the upper chamber; wherein the lampshade is arranged at the bottom of the intermediate panel, and the position of the intermediate panel corresponding to the luminescent body is provided with a first avoidance hole.

2. The underwater speaker according to claim 1, wherein the lampshade extends outward on the circumference of a first opening to form a first extension part, connecting to the intermediate panel.

3. The underwater speaker according to claim 2, wherein the bottom surface of the intermediate panel protrudes downwards to form a limiting wall, with the lampshade inside; wherein on the inner side of the limiting wall, there are multiple spaced adapter blocks; wherein the adapter blocks form an insertion slot with the bottom surface of the intermediate panel, and the first extension part is located inside the insertion slot.

4. The underwater speaker according to claim 3, wherein a second avoidance hole is provided at the position of the first extension part corresponding to the adapter block.

5. The underwater speaker according to claim 1, wherein the graphic mapping unit can be a through hole, a graphics groove formed by a concave inner or outer wall of the lampshade, or a graphics convex block formed by a convex inner or outer wall of the lampshade.

6. The underwater speaker according to claim 1, wherein the shape of the graphic mapping unit is one or more shapes of animals, plants, geometrics, or irregular shapes.

7. The underwater speaker according to claim 1, wherein the outer shell is provided with a sound outlet in the corresponding sound direction of the speaker, and a flexible protective cover is arranged on the diaphragm of the speaker, with the protective cover protruding towards the direction of the sound outlet.

8. The underwater speaker according to claim 7, wherein the circuit board is provided with multiple key switches, and the corresponding position of the key switch in the outer shell is provided with a pressing element.

9. The underwater speaker according to claim 8, wherein a second opening is provided at the position of the key switch corresponding to the outer shell, and the outer shell extends downwards on the circumference of the second opening to form a compression wall; wherein the pressing element is provided with a holding slot with a third opening at the bottom, and the pressing element is placed inside the compression wall and sleeved on multiple key switches; wherein the material of the pressing element is soft adhesive, and the bottom circumference of the pressing element extends outward to form a sealing extension, locating between the compression wall and the circuit board.

10. The underwater speaker according to claim 8, wherein the top of each key switch in the holding slot is provided with a pressing convex column.

11. The underwater speaker according to claim 9, wherein a supporting frame with fourth openings at the upper and lower ends is provided in the holding slot to support the pressing element.

12. The underwater speaker according to claim 10, wherein the supporting frame is sleeved on the outer side of multiple key switches, and a supporting partition is set between two adjacent key switches within the supporting frame.

13. The underwater speaker according to claim 12, wherein the height of the supporting frame is consistent with the depth of the holding slot; wherein the bottom circumference of the supporting frame extends outward to form a second extension portion, locating between the sealing extension portion and the circuit board; wherein the depth of the holding slot is consistent with the height of the supporting frame after removing the second extension portion.

14. The underwater speaker according to claim 7, wherein a battery is electrically connected to the circuit board in the upper chamber, and the battery is located on one side of the speaker.

15. The underwater speaker according to claim 14, wherein the battery is a rechargeable battery, and the outer shell is provided with a charging interface, electrically connecting to the circuit board and used for external power supply; wherein the position of the charging interface corresponding to the outer shell is equipped with an openable waterproof rubber plug.

16. The underwater speaker according to claim 15, wherein the sound outlet is located at the top of the middle of the outer shell, and the pressing element is located on the side of the speaker away from the battery; wherein there is also a counterweight in the upper chamber, and the counterweight and the charging interface are both located on the side of the speaker away from the battery.

17. The underwater speaker according to claim 7, wherein the outer shell comprises a surface shell and a bottom shell connected to the surface shell; wherein the intermediate panel is installed on the surface shell; wherein the upper chamber is formed surrounding by the surface shell and the intermediate panel, and the lower chamber is formed surrounding by the intermediate panel and the bottom shell; wherein the compression wall, the sound outlet, and the second opening are all located on the surface shell; wherein the materials of the bottom shell and the lampshade are both transparent materials; wherein a sealing ring is set between the surface shell and the bottom shell.

18. The underwater speaker according to claim 17, wherein the bottom shell is a water textured outer shell.

19. The underwater speaker according to claim 18, wherein the outer shell also comprises an outer cover sleeved on the outer side of the surface shell, and the outer cover is provided with a fifth opening on both sides of the sound outlet, and the fifth opening is conductive to the sound outlet; wherein the outer cover is provided with an echo wall protruding towards the sound outlet at the top of the sound outlet, and a waterproof rubber plug is arranged on the outer cover.

* * * * *